United States Patent
Jackson et al.

(10) Patent No.: US 6,968,402 B2
(45) Date of Patent: Nov. 22, 2005

(54) SYSTEM AND METHOD FOR STORING CHUNKS OF FIRST CACHE LINE AND SECOND CACHE LINE IN A BUFFER IN A FIRST AND SECOND CHUNK ORDER

(75) Inventors: David R. Jackson, Hillsboro, OR (US); Stephen W. Kiss, Banks, OR (US); Miles F. Schwartz, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/444,816

(22) Filed: May 22, 2003

(65) Prior Publication Data

US 2003/0196004 A1 Oct. 16, 2003

Related U.S. Application Data

(63) Continuation of application No. 09/474,081, filed on Dec. 29, 1999, now Pat. No. 6,633,927.

(51) Int. Cl.[7] .......................... G06F 13/00; G06F 12/00
(52) U.S. Cl. .................. 710/52; 710/5; 710/20; 710/35; 711/5; 711/167; 711/169; 712/2; 712/207; 712/210

(58) Field of Search ................ 710/5, 35, 20, 710/52; 711/5, 167, 137, 169, 170; 712/207, 210, 216, 2

(56) References Cited

U.S. PATENT DOCUMENTS

| | | | |
|---|---|---|---|
| 5,412,791 A | | 5/1995 | Martin et al. |
| 5,627,991 A | | 5/1997 | Hose, Jr. et al. |
| 5,724,536 A | * | 3/1998 | Abramson et al. .......... 712/216 |
| 5,886,843 A | | 3/1999 | Ozue et al. |
| 5,923,857 A | * | 7/1999 | Pawlowski et al. ......... 710/107 |
| 5,956,746 A | * | 9/1999 | Wang .......................... 711/137 |
| 6,055,538 A | * | 4/2000 | Kessenich et al. .......... 707/101 |
| 6,260,127 B1 | * | 7/2001 | Olarig et al. ................ 711/167 |
| 6,505,259 B1 | * | 1/2003 | Garcia et al. ................ 710/35 |

* cited by examiner

Primary Examiner—Tammara Peyton
(74) Attorney, Agent, or Firm—Jeffrey B. Huter

(57) ABSTRACT

Techniques to buffer and present chunks are disclosed. In some embodiments, a first interface may receive chunks of a first cache line, and a second interface may receive chunks of a second cache line. A buffer may store chunks of the first cache line in a first chunk order and may store chunks of the second cache line in a second chunk order. A control unit may present a requester via the second interface with one or more chunks of the first cache line from the buffer.

16 Claims, 9 Drawing Sheets

FIG. 3

| BIT PATTERN | | LINEAR CHUNK ORDER | | | | | | | |
|---|---|---|---|---|---|---|---|---|---|
| (bin) | (hex) | 1ST | 2ND | 3RD | 4TH | 5TH | 6TH | 7TH | 8TH |
| 000 | 0 | 0 | 8 | 10 | 18 | 20 | 28 | 30 | 38 |
| 001 | 8 | | | | SAME AS 000 | | | | |
| 010 | 10 | 10 | 18 | 20 | 28 | 30 | 38 | N/A | N/A |
| 011 | 18 | | | | SAME AS 010 | | | | |
| 100 | 20 | 20 | 28 | 30 | 38 | N/A | N/A | N/A | N/A |
| 101 | 28 | | | | SAME AS 100 | | | | |
| 110 | 30 | 30 | 38 | | | N/A | | | |
| 111 | 38 | | | | SAME AS 110 | | | | |

FIG. 4

| BIT PATTERN | | CRITICAL CHUNK ORDER | | | | | | | |
|---|---|---|---|---|---|---|---|---|---|
| (bin) | (hex) | 1ST | 2ND | 3RD | 4TH | 5TH | 6TH | 7TH | 8TH |
| 000 | 0 | 0 | 8 | 10 | 18 | 20 | 28 | 30 | 38 |
| 001 | 8 | 8 | 0 | 10 | 18 | 28 | 20 | 38 | 30 |
| 010 | 10 | 10 | 18 | 0 | 8 | 30 | 38 | 20 | 28 |
| 011 | 18 | 18 | 10 | 8 | 0 | 38 | 30 | 28 | 20 |
| 100 | 20 | 20 | 28 | 30 | 38 | 0 | 8 | 10 | 18 |
| 101 | 28 | 28 | 20 | 38 | 30 | 8 | 0 | 18 | 10 |
| 110 | 30 | 30 | 38 | 20 | 28 | 10 | 18 | 0 | 8 |
| 111 | 38 | 38 | 30 | 28 | 20 | 18 | 10 | 8 | 0 |

US 6,968,402 B2

SYSTEM AND METHOD FOR STORING CHUNKS OF FIRST CACHE LINE AND SECOND CACHE LINE IN A BUFFER IN A FIRST AND SECOND CHUNK ORDER

This a continuation of Ser. No. 09/474,081 filed Dec. 29, 1999, now U.S. Pat. No. 6,633,927.

FIELD

The invention relates to a device and method to minimize data latency and maximize data throughput to and from memory using multiple data valid signals that also enable translation between linear and critical chunk addressing.

BACKGROUND

Microprocessor performance has seen incredible increases over the short history of computers. With this increase in processor performance, seen in the increased number of processor cycles per second, has come the need for a comparable increase in access speed to data and instructions. Otherwise, it provides little benefit to have a very fast processor if it is spending most of its time waiting for retrieval of data and instructions from memory. One method used to improve access speed to data and instructions is using cache memory which cycles at the same speed as the processor. However, cache memory is expensive and the amount available to a processor is thus limited. Therefore, a need exists to facilitate memory access to data and instructions.

In order to overcome this problem, computer manufactures have employed separate devices or chips to handle memory addressing, access, transfer, and retrieval when requested by a processor or other device. The use of these devices has improved performance since they are specifically designed to handle only memory access, but all too often they have proven to be complex, difficult to implement and still slow. Therefore, in some cases these devices actually form a bottleneck to maximum processor utilization. For example, when a read operation immediately follows a write operation of a given data location in memory it is often necessary, in some designs, to wait until complete transfer of all data involved in the write before execution of the read. This causes the processor or input/output (I/O) device requesting the read to wait needlessly for the completion of the write. Further, these devices frequently are required to interface to multiple ports in order to interface to the processors, input/output devices and memory. In those instances, where the devices take the form of a chip, it is often required to create separate data paths for each port which uses more space on the chip and thereby requires a larger chip that uses more space on the board, consumes more power and produces more heat.

Further, processors and other I/O devices may have specific requirements as to how data is to be ordered for presentation. Any device that accesses memory at the request of a processor or other I/O device must be able to translate from one form of desired presentation to another while still being able to keep latency and space used on the chip to a minimum and throughput to a maximum without unduly increasing the complexity of the logic required.

Therefore, what is needed is a device and method of accessing memory through multiple ports that minimizes data latency, maximizes data throughput without requiring a large number of data lines or complex logic. This device and method must also be able to translate from one data format to another without sacrificing latency or throughput.

SUMMARY

An example embodiment of the present invention is directed to a device for servicing data read and write requests from a plurality of processors and an I/O interface connected to a plurality of I/O devices. This device uses a system data chip to receive a read request for data from one of the processors or the I/O interface. This system data chip also has a data buffer to store data in a first data format and a second data format received by the system data chip as a result of the read request. The system data chip also has a control/status unit to control when writing the data to the data buffer occurs and when reading from the data buffer occurs based on a first valid bit or a second valid bit.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein:

FIG. 3 is a table showing examples of linear chunk ordering of data;

FIG. 4 is a table showing examples of critical chunk ordering of data;

DETAILED DESCRIPTION

Figure 1:
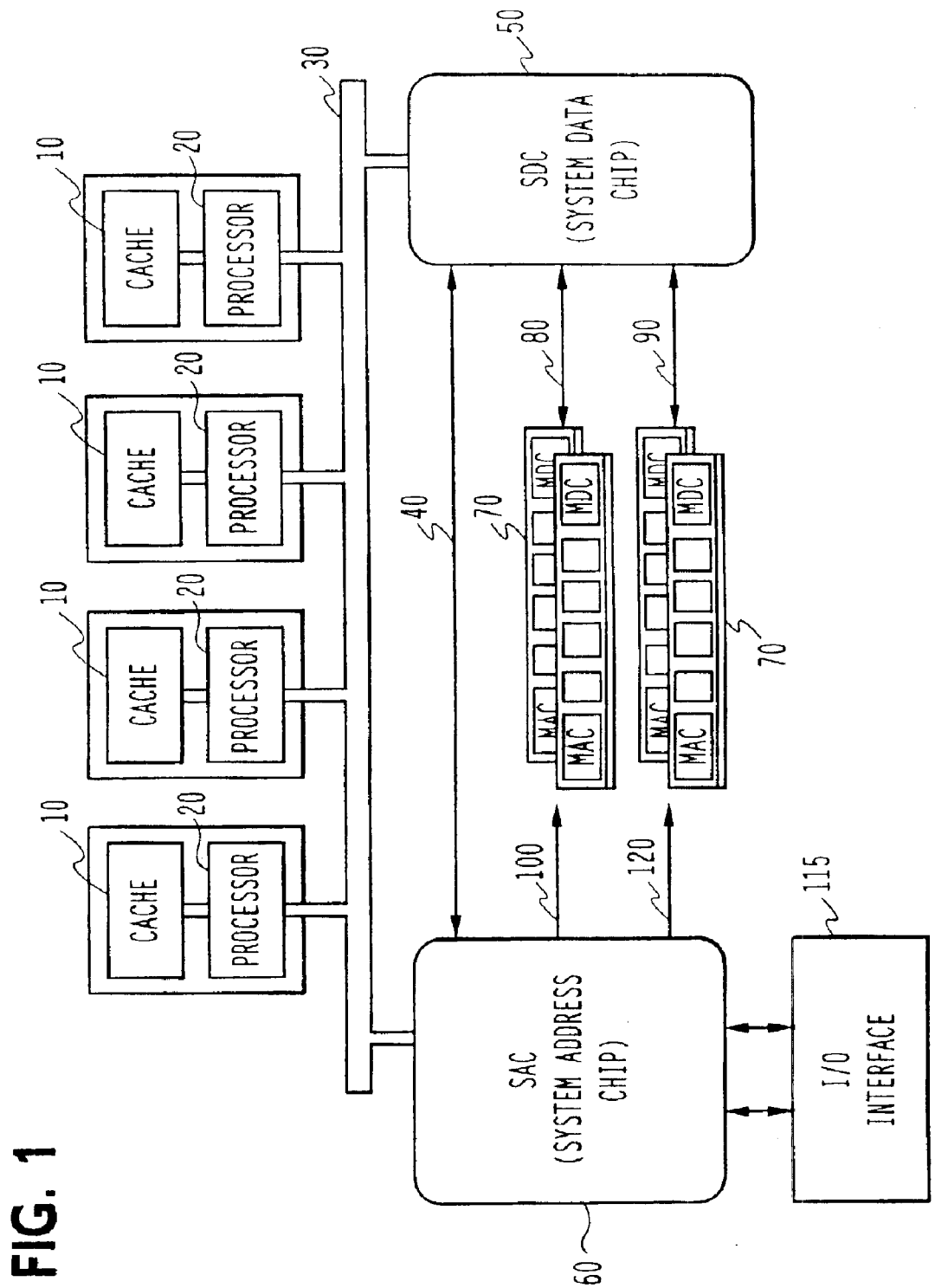
FIG. 1 is an example of an overall system diagram showing a multi-processor computer system.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same. As a final note, well-known power connections to integrated circuits and other components may not be shown within the FIGS. for simplicity of illustration and discussion, and so as not to obscure the invention.

FIG. 1 illustrates an example of an embodiment of the present invention in which more than one processor 20 may interface to microprocessor bus 30. Each processor 20 may have its own cache 10 memory associated with it. As would be appreciated by one of ordinary skill in the art, the present invention may be configured with only a single processor 20 and its associated cache 10 or any number of processors 20 and associated caches 10. In addition to the processor 20 interfacing to microprocessor bus 30, the system address chip (SAC) 60 and the system data chip (SDC) 50 may also interface to microprocessor bus 30. Both SAC 60 and SDC 50 may be used to address and access memory 70. SAC 60 may also interface to memory through memory interface 100 and memory interface 110. SDC 50 may interface to memory 70 through memory interface 80 and memory interface 90. In addition, communications between SAC 60 and SDC 50 may be accomplished through private bus 40. All read and write requests from processor 20 or input/output (I/O) interfaces 115 may be facilitated by using SAC 60 and SDC 50. SAC 60 also may communicate to one or more I/O interface 115 which may take the form of one or more PCI (peripheral component interconnect) expander bridges and one or more graphics expander bridges. Therefore, not only may one or more processor 20 read or write to memory 70 but I/O interface 115 may also read or write to memory through SDC 60 via SAC 60 and the private bus 40.

Figure 2:
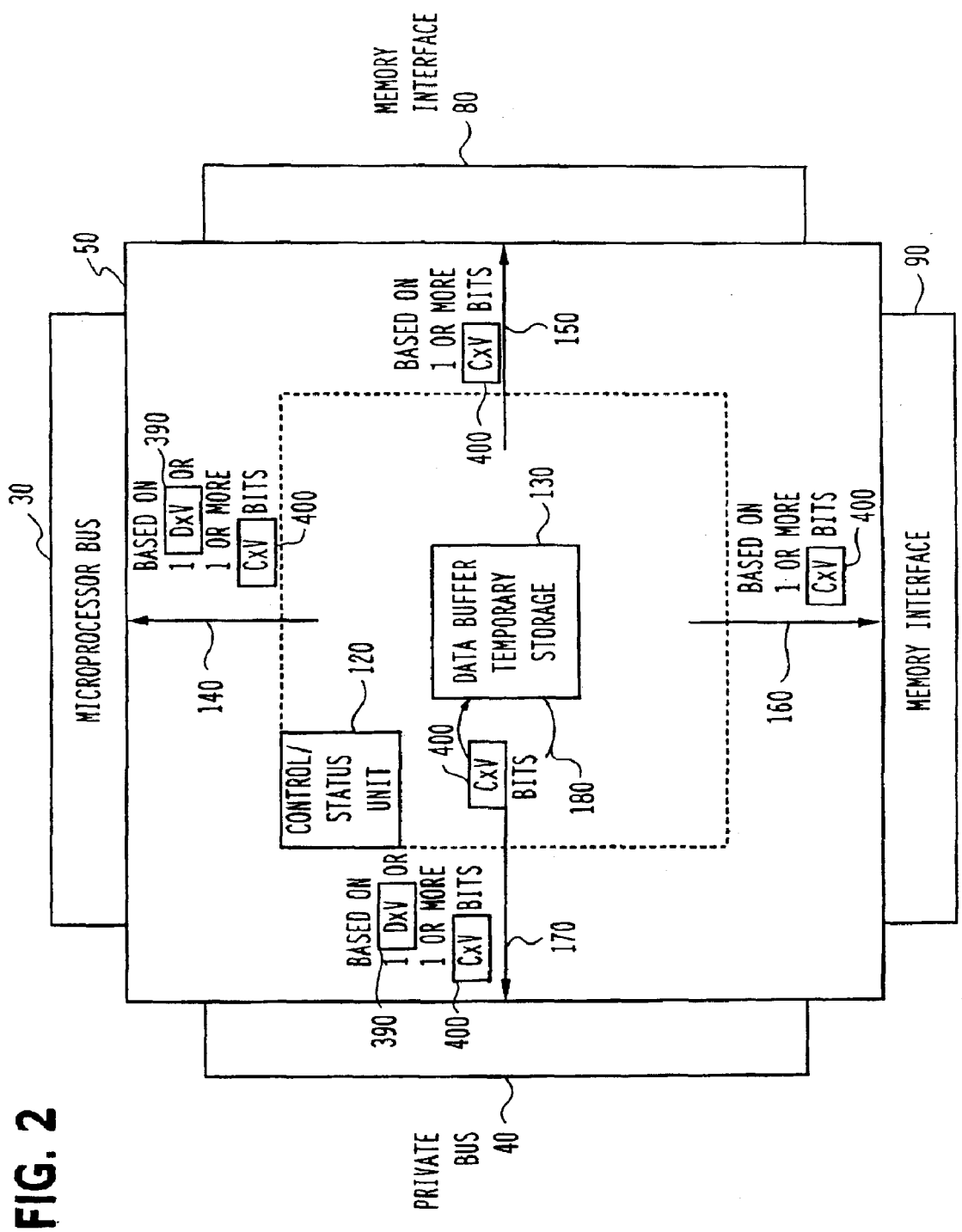
FIG. 2 is a diagram of a system data chip (SDC) showing the communication links depicted in FIG. 1 and some of the internal control structure in an example embodiment of the present invention.

Referring to FIG. 2, the internal structure and operation of a portion of the SDC 50 is shown for an example embodiment of the present invention. As illustrated in both FIG. 1 and FIG. 2, SDC 50 communicates to the remainder of the system through microprocessor bus 30, private bus 40, memory interface 80 and memory interface 90. The SDC 50 communicates to private bus 40 through internal interface 170; to microprocessor bus 30 through internal interface 140; to memory interface 80 through internal interface 150; and to memory interface 90 through internal interface 160.

Still referring to FIG. 2, the SDC 50 may use control/status unit 120 to receive read and write requests to memory 70 and control the process of reading and writing to and from memory 70, as well as receiving and transferring data to and from the requesting processor 20 or I/O interface 115. The control/status unit 120 may use at least two valid bits or signals and at least one finite state machine (FSM) signal to control when read and write operations take place. Further, as will become apparent to one of ordinary skill in the art, by the control/status unit 120 using the valid bits or signals, a FSM signal and other signals, the SDC 50 may optimize read operations to minimize latency and maximize throughput. These at least two valid bits include a complete user or supplier valid (CxV, also referred to as a second valid bit or signal) 400 bit(s) and a data user or supplier valid (DxV, also referred to as a first valid bit or signal) 390 bit(s). In this instance, a user or supplier generally refers to the user or supplier of a byte enable which indicates whether a byte(s) in memory may be overwritten. Therefore, there exists at least two CxV 400 bit(s) and at least two DxV 390 bit(s). However, in the discussion ahead, the example embodiments shown in FIGS. 2 and 5 through 9 only explain the present invention using examples showing a single CxV 400 bit and a single DxV 390 bit solely to avoid needless confusion and without the intent of limiting the scope of the present invention. The use of the valid bits, CxV 400 and DxV 390, as well as the FSM signal will be discussed in further detail ahead and particularly in reference to FIGS. 5 through 9.

Still referring to FIG. 2, the SDC 50 using the control/status unit 120 may communicate to memory 70 via internal interface 150 and internal interface 160, based on at least one CxV 400 bit. Internal copy operation 180 to data buffer temporary storage (data buffer) 130 may also be controlled by control/status unit 120 and based on at least one CxV 400 bit. Also, the SDC 50 may use control/status unit 120 to interface to memory 70 via internal interface 150, internal interface 140, internal interface 160 and internal interface 170, based on at least one CxV 400 bit and at least one DxV 390 bit.

Read and write operations may use private bus 40 to memory 70 using linear chunk order 210 to arrange the data as discussed in detail ahead. Read and write operations may also use microprocessor bus 30, memory interface 80 and memory interface 90 and use critical chunk order 215 to arrange the data as discussed in detail ahead. The operation of control/status unit 120 in conjunction with DxV 390 bit and CxV 400 bit is discussed in detail ahead in reference to the read, write and copy operations shown in FIGS. 5 through 9. As will become apparent to one of ordinary skill in the art, the example embodiments of the present invention take into consideration formatting data for both linear chunk order 210 and critical chunk order 215 and the translation between the two forms of formatting While still minimizing latency and maximizing throughput. Therefore, a brief explanation of linear chunk order 210 and critical chunk order 215 is provided ahead.

Linear Chunk Order

Referring to FIG. 3, read and write requests may be initiated by any source through private bus 40, such as I/O interface 115 shown in FIG. 1 to retrieve from or store data to memory 70. Read requests may take one of two forms. The first data format is depicted in FIG. 3 and provides for a linear chunk order (first data format) 210 on a cache line basis and may be used when communications takes place through private bus 40. A bit pattern 200 may be specified by the SAC 60 based on a read request from processor 20 or I/O interface 115 and transmitted through private bus 40 to SDC 50. Based on the bit pattern 200, the SDC 50 retrieves a cache line of data from memory 70. From that bit pattern 200 a linear chunk order 210 may be presented to the requesting I/O interface 115 through private bus 40. A linear chunk order 210 may be up to 64 bytes in length and divided into four double chunks. A chunk is the smallest time ordered unit of transfer which may be eight bytes in length and a double chunk may be sixteen bytes in length. These chunks are labeled $1^{st}$ data chunk 220, $2^{nd}$ data chunk 230, $3^{rd}$ data chunk 240, $4^{th}$ data chunk 250, $5^{th}$ data chunk 260, $6^{th}$ data chunk 270, $7^{th}$ data chunk 280, and $8^{th}$ data chunk 290. This presentation to I/O interface 115 of linear chunk order 210 may be supplied in a linear manner on a double chunk boundary as shown in the example supplied in FIG. 3.

As indicated in FIG. 3, when a bit pattern 200 of hexadecimal 0 (binary 000) is specified up to the entire cache line is accessed and presented to I/O interface 115. However, when a hexadecimal bit pattern 200 of, for example, 20 (binary 100) is specified, only data chunks with hexadecimal addresses 20, 28, 30 and 38 may be presented. Data chunks with bit pattern 200 of hexadecimal addresses 0, 8, 10 and 18 are not presented to the I/O interface 115. The same is true when a hexadecimal bit pattern of 28 (binary 101) is provided since this bit pattern lies within and not on a double chunk boundary. Therefore, linear chunk order 210 presents data to the requesting I/O interface 115 starting at the location specified by the bit pattern 200 if that location falls on a double chunk boundary or starting at an earlier chunk boundary if the bit pattern 200 does not fall on a double chunk boundary. However, any data that may exist prior to the given double chunk boundary may not be presented to the I/O interface 115.

Critical Chunk Order

FIG. 4 illustrates an example of critical chunk order (second data format) 215 which is the second form a read request may take and is also supported by SDC 50 for processor 20 or I/O interface 115 through read operations. This form of read operation may be used when the SDC 50 communicates to microprocessor bus 30, memory interface 80 and memory interface 90. The SDC 50 may use data buffer temporary storage 130 which allows each chunk of a cache line to be individually accessed within the cache line. The specific data order is presented to processor 20 is based on bit pattern 200, shown in FIG. 4.

In a similar fashion to that shown in FIG. 3, FIG. 4 illustrates that a chunk 210 may be up to 64 bytes in length and may be divided into eight eight-byte chunks labeled $1^{st}$ data chunk 220, $2^{nd}$ data chunk 230, $3^{rd}$ data chunk 240, $4^{th}$ data chunk 250, $5^{th}$ data chunk 260, $6^{th}$ data chunk 270, $7^{th}$ data chunk 280, and $8^{th}$ data chunk 290. Read operations may involve memory interface 80, memory interface 90, and microprocessor bus 30 and may receive data in critical chunk order 215 to store in memory 70 from SDC 50. Unlike linear chunk 210 order discussed above in reference to FIG. 3, data may be read from memory 70 on an chunk rather than a double chunk boundary.

As indicated in FIG. 4, when a hexadecimal bit pattern 200 of 0 (binary 000) is provided to SDC 50, the returned data is the same format as that shown in FIG. 3 for linear chunk order 210. However, if some other bit pattern 200 is provided to SDC 50, the data chunks, 230 through 290, may be transmitted to the requesting processor 20 or I/O interface 115 in the order shown in FIG. 4. For example, when a hexadecimal bit pattern 200 of 10 (binary 010) is specified, the $1^{st}$ data chunk 220 contains data located at hexadecimal location 10. The $2^{nd}$ data chunk 230 contains data located hexadecimal location 18. Therefore, the most important or critical chunk of data requested by processor 20 or I/O interface 115 are presented first. In the $3^{rd}$ data chunk 240 data at hexadecimal location 0 would be provided. The remaining data chunks, 250 through 290, may contain data located at hexadecimal locations 38, 30, 28 and 20, respectively.

Keeping in mind that two distinct types of data formatting may occur in the example embodiments of the present invention, any reference to read operations involving the private bus 40 may use linear chunk order 210 and any reference to a read operation involving microprocessor bus 30, memory interface 80 and memory interface 90 may use critical chunk order 215. Therefore, a detailed description will now be provided for the read, write and copy operations in the SDC 50 with reference to FIG. 2, and FIGS. 5 through 9. As will become apparent to one of ordinary skill in the art, read operations may be optimized by sometimes using dual (as opposed to single) valid signals (i.e., the CxV 400 bit and DxV 390 bit) as well as other signals to minimize latency and maximize throughput without increasing the number of the data lines used or the complexity of the logic in the SDC 50.

The control status unit 120 and other components with the system have some type of arrangement (e.g., a lookup table) which allows such components to look at the type or nature of the memory access request and its requirements, and to control the timings of the various signals according to predetermined manners so as to correctly perform all aspects of the memory access while also attempting to minimize latency. For instance, such lookup table or arrangement may allow some predetermined operations to occur simply, via control of a single data valid signal, whereas other complex operations may be controlled using two or more data valid signals, and may involve further signals. This will become more apparent in the examples to follow. Before beginning such examples, it should be noted that such lookup tables or arrangement must be designed on a case-by-case basis, depending upon many particulars of the specific system in which it is implemented.

Read Operation from Microprocessor Bus 30 or Private Bus 40 Based DxV 390 Bit

Figure 5:
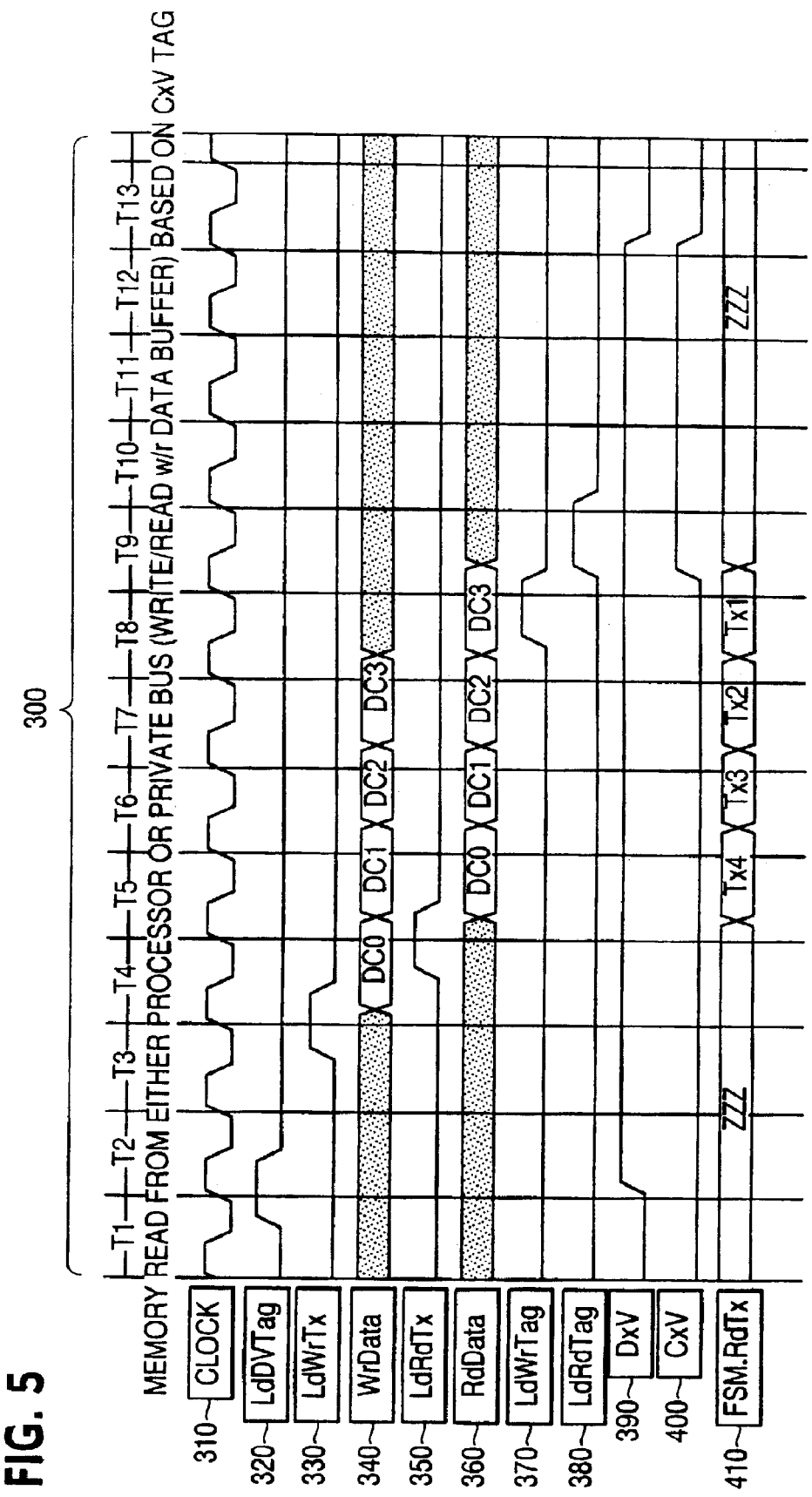
FIG. 5 is an example signal diagram showing signal levels in an example embodiment of the present invention.
Figure 6:
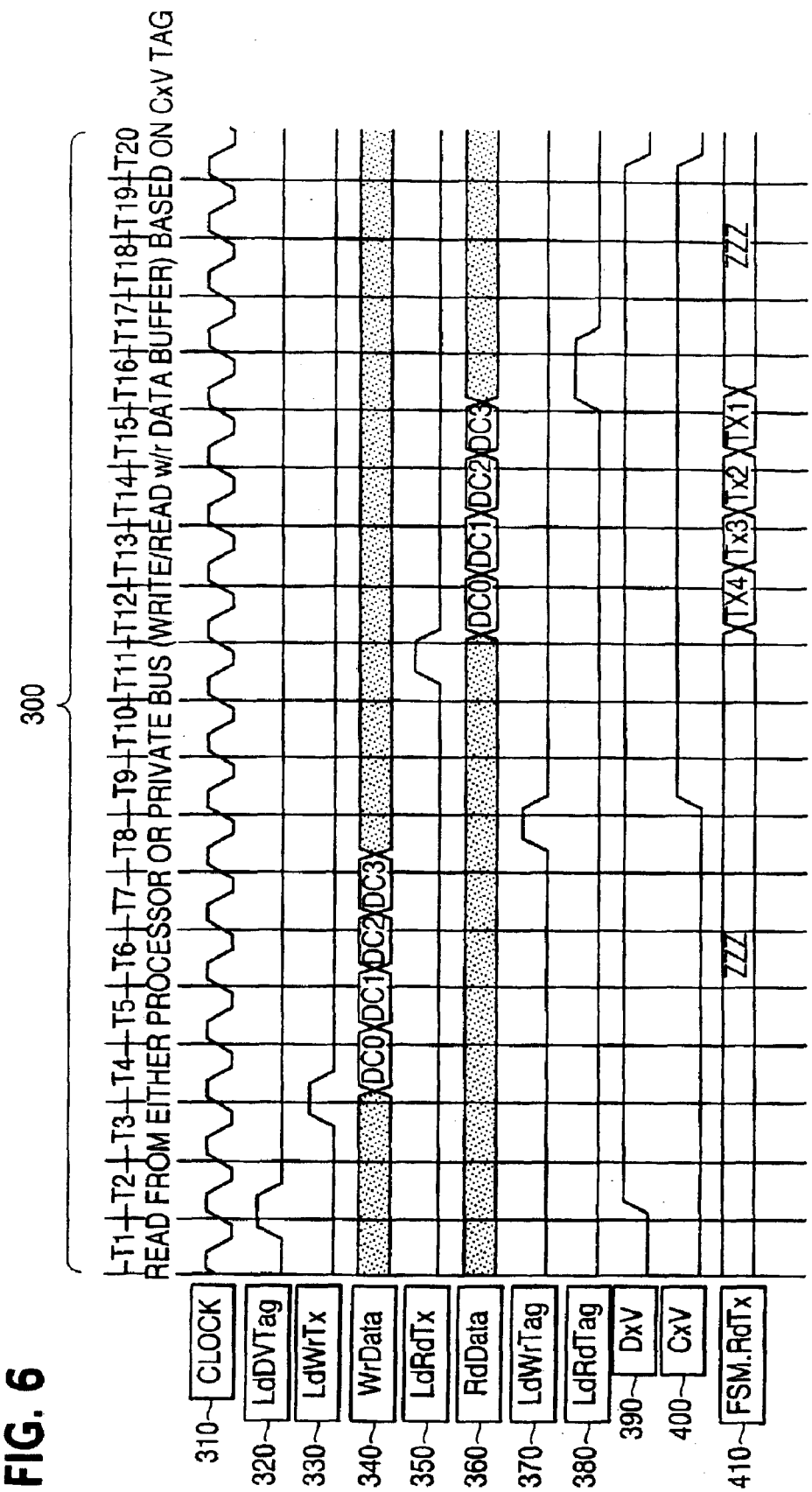
FIG. 6 is another example signal diagram showing signal levels in an example embodiment of the present invention.
Figure 7:
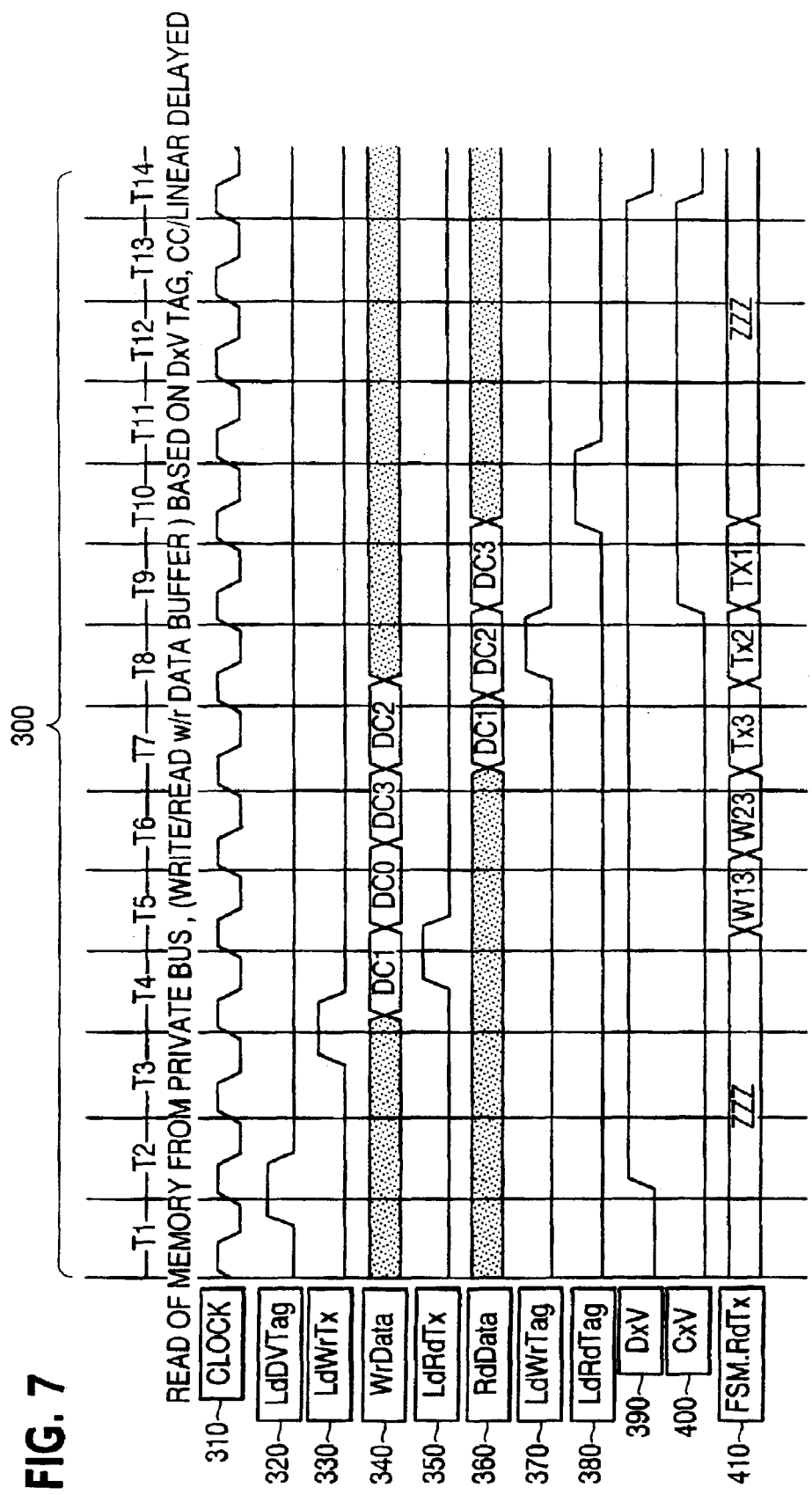
FIG. 7 is still another example signal diagram showing signal levels in an example embodiment of the present invention.

FIGS. 5 through 7 are example embodiments of read operations in the present invention showing illustrative signals which permit the reading of data chunks shortly after writing that data without waiting for the entire cache line to be written. The example operations discussed ahead would entail communications to memory 70 via internal interface 150 and internal interface 160. Further, data may be presented to the requesting processor 20 or I/O interface 115 via internal interface 140 and microprocessor bus 30 or through internal interface 170 and private bus 40. Data may be presented in either linear chunk order 210 or critical chunk order 215.

All the signals shown in FIGS. 5 through 9 are generated from four sources. The first source is the system clock 310 which generates the clock cycles 310. The second source is the microprocessor bus 30, the private bus 40 and memory interfaces 80 and 90 which generate the load data valid tag (LdDVTag) 320 which indicates to the SDC 50 that a read request is or will be returning data into the data buffer temporary storage 130. The third source is the control/status unit 120 which generates the load write transaction (LdWrTx) 330 signal, the load read transaction (LdRdTx) 350 signal, load write tag (LdWrTag) 370, load read tag (LdRdTag) 380, the DxV 390 bit, and the CxV 400 bit. The fourth source is the data buffer temporary storage 130 which generates the finite state machine read transaction signal (FSM.Rd.Tx) 410 and provides data as shown in write data (WrData) 340 and read data (RdData) 360.

Referring to FIG. 5, clock 310 generates clock cycles 300 labeled T1 through T13. The clock cycles 300 serve the purpose of synchronizing the circuitry shown in FIGS. 1 and 2. Upon a processor 20 or I/O interface 115 requesting a read of data, the interface returning the data to the data buffer temporary storage 130 will set LdDVTag 320 to high in clock cycle 300 labeled T1. This interface may be either the internal interfaces 140, 150, 160, and 170. This serves to alert SDC 50 of the incoming data and triggers the control status unit to set DxV 390 to high. In clock cycle 300 labeled T2, DxV 390 bit may be set high by the control/status unit 120 to alert the remainder of the SDC 50 that within three clock cycles a write to data buffer temporary storage 130 will begin. Using this DxV 390 bit, the SDC 50 may take preparatory actions in the three clock cycles, such as transaction arbitration to start the read out of the data buffer temporary storage 130 as well as the SDC 50 taking control of either the private bus 40 or microprocessor bus 30 so as to accept or transmit the data. Further, if the data is coming from memory 70, the SDC 50 may access memory 70 to acquire the requested data.

Still referring to FIG. 5, upon arrival of the first byte of data, the control/status unit 120 may set LdWrTx 330 to high in clock cycle 300 labeled T3 to signal the data buffer temporary storage 130 to receive and store the chunks labeled DC0 through DC3 (double chunks 0 through 3) into the data buffer temporary storage 130 own memory as shown in WrData 340. As indicated in FIG. 5, the data arrives in linear chunk order 210 and may be stored in the same manner. Immediately upon storage of chunk labeled DC0, as shown in WrData 340, chunk DC0 is available for reading as indicated by the I/O control/status unit 120 setting LdRdTx 350 high in clock cycle 300 labeled T4. Therefore, the read request may be responded to immediately by reading the data chunk from the data buffer temporary storage 130 as it is written into the data buffer temporary storage 130. Thus, data chunk DC0 is shown as being read out of data buffer temporary storage 130 in clock cycle 300 labeled T5 in RdData 360.

Once all data chunks, DC0 through DC3, have been written to data buffer temporary storage 130 in WrData 340 this triggers the control/status unit 120 to set the LdWrTag 370 to high in clock cycle 300 labeled T8 to indicate the completion of the write operation to data buffer temporary storage 130. In turn the setting of the LdWrTag 370 to high may trigger the control/status unit 120 to set the CxV 400 bit to high in clock cycle 300 labeled T9 to indicate that the write has completed. Both the DxV 390 bit and CxV 400 bit remain high the transaction is completed which causes them to be reset. The read operation from data buffer temporary storage 130 is completed with the reading of data chunk DC3 in clock cycle 300 labeled T9 which triggers the control/status unit 120 to set the LdRdTag 380 to high.

The last signal shown in FIG. 5 is the FSM.RdTx 410 signal which is output by the data buffer temporary storage 130 is indicative of the state or operation the read port (not shown) of the data buffer temporary storage 130 is in. In the example embodiment shown in FIG. 5, the FSM.RdTx 410 signal indicates that it is idle (ZZZ) in clock cycles 300 labeled T1 through T4 and T9 through T13. In clock cycles 300 labeled T5 the FSM.RdTx 410 signal indicates the number of data chunks that remain to be read. Therefore, in clock cycles 300 labeled T5 four data chunks remain to be read (Tx4), while in clock cycles 300 labeled T7 two data chunks remain to be read (Tx2).

As can be seen in the example embodiment shown in FIG. 5 and the foregoing discussion, the write to data buffer temporary storage 130 followed immediately by a read operation is triggered by the setting of the DxV 390 bit which was triggered by the setting of the LdDVTag 320. All other events follow from the setting of the DxV 390 bit by the control/status unit 120. Further, data can be read and transmitted to a requesting processor 20 or I/O interface 115 within one clock cycle 300 of being written to data buffer temporary storage 130. This is possible because the data is being written to and be may read from the data temporary storage 130 in linear chunk order 210 and the data is from a single source.

Read Operation from Microprocessor Bus 30 or Private Bus 40 Based DxV 390 Bit Involving a Merge Function FIG. 6 illustrates another example embodiment of the present invention except that it is now assumed that the data is coming from two different sources and must be combined in the data buffer temporary storage 130. An example is when a speculative read of memory is out-of-date and must be read again to acquire the most current data. Another example of such a merge or combination may be required when two or more processors 20 are executing instructions in parallel on consecutive data chunks in a single array of data. However, as would be appreciated by one of ordinary skill in the art other types of merge or combination operations are possible. As will be seen in the discussion of FIG. 6 ahead, it is no longer possible to read from data buffer temporary storage 130 immediately after writing a data chunk. Further in FIG. 6, only the CxV 400 bit is needed to control the operations of the SDC 50. However, even though the response to the read in FIG. 6 is not as quick as that of FIG. 5 it is still substantially faster than writing the data to memory 70 and then reading it from memory 70. In the discussion of FIG. 6, only those features that differ from those of FIG. 5 will be discussed in detail and those features not discussed in reference to FIG. 6 are identical to those previously discussed for FIG. 5

Referring to FIG. 6, as with FIG. 5, when a processor 20 or I/O interface 115 requests a read, the interface returning the data into the data buffer temporary storage 130 will set LdDVTag 320 to high in clock cycle 300 labeled T1. This interface may be either the internal interfaces 140, 150, 160, and 170. This serves to alert SDC 50 of the incoming data and may trigger the control status unit 120 to set DxV 390 to high in clock cycle 300 labeled T2. This setting of DxV 390 bit to high by the control/status unit 120 may be done to alert the remainder of the SDC 50 that within three clock cycles a write to data buffer temporary storage 130 followed by a read from data buffer temporary storage 130 will begin. Using this DxV 390 bit, the SDC 50 may take preparatory actions in the three clock cycles as discussed in reference to FIG. 5. However, as mentioned earlier, data entering the SDC 50 is coming from two different sources in the write operation to data buffer temporary storage 130 and the control/status unit 120 is aware of this since either the data is coming in through two different buses, the private bus 40 and the microprocessor bus 30, from two different processors 20 over the microprocessor bus 30, two different devices through the I/O interface 115, or any combination of the above.

Still referring to FIG. 6, upon arrival of the first byte of data, the control/status unit 120 sets LdWrTx 330 to high in clock cycle 300 labeled T3 to signal the data buffer temporary storage 130 to receive and store the chunks labeled DC0 through DC3 into the memory of the data buffer temporary storage 130 as shown in WrData 340. As indicated in FIG. 6, the data arrives in linear chunk order 210 and is stored in the same manner. Unlike the example embodiment shown in FIG. 5, data is not immediately read out of data buffer temporary storage 130 as it arrives into it. Instead, upon completion of the writing of data chunk DC3 in WrData 340 the I/O control/status unit 120 may set LdWrTag 370 to high in clock cycle 300 labeled T8 and this triggers the setting of CxV 400 bit to high in clock cycle 300 labeled T9. In the example embodiment shown in FIG. 6, the setting of CxV 400 bit may serve two functions. First, it may indicate that the write operation to data buffer temporary storage 130 is completed. Second, it may signal data buffer temporary storage 130 to anticipate a read request within three clock cycles. This three cycle delay is required by the hardware to setup the read operation as previously discussed in reference to FIG. 5.

As indicated above, the setting of the LdWrTag 370 to high triggers the control/status unit 120 to set the CxV 400 bit to high. Both the DxV 390 bit and CxV 400 bit remain high until the transaction is complete. Within three clock cycles 300 of the setting of the CxV bit to high, the LdRdTx 350 signal is set high in clock cycle 300 labeled T11 and the read from data buffer temporary storage 130 begins in clock cycle 300 labeled T12. The read operation from data buffer temporary storage 130 is completed with the reading of data chunk DC3 in clock cycle 300 labeled T16 which may trigger the control/status unit 120 to set the LdRdTag 380 to high.

The last signal shown in FIG. 6 is the FSM.RdTx 410 signal may be output by the data buffer temporary storage 130 to indicate the state or operation it is in. In the example embodiment shown in FIG. 6, the FSM.RdTx 410 signal indicates that it is idle (ZZZ) in clock cycles 300 labeled T1 through T11 and T16 through T20. In clock cycles 300 labeled T12 through T16 the FSM.RdTx 410 signal indicates the number of data chunks that remain to be read as discussed in reference to FIG. 5.

As can be seen in the example embodiment shown in FIG. 6 and the foregoing discussion, the write to data buffer temporary storage 130 followed immediately by a read operation is triggered by the setting of the DxV 390 bit which was triggered by the setting of the LdDVTag 320. However, the read operation in this embodiment of the invention was triggered by the setting of the CxV 400 bit. All other events follow from the setting of the DxV 390 bit by the control/status unit 120. Further, data can be read and transmitted to a requesting processor 20 or I/O interface 115 within three clock cycles 300 of the completion of the entire write to data buffer temporary storage 130. This brief delay in accomplishing the read is due to the requirement that the write must first be completed since data is being provided from at least two different sources.

Read Operation from Private Bus 40 Based on DxV 390

FIG. 7 illustrates another example embodiment of the present invention in which data enters the SDC 50 in critical chunk order 215 and then is read from the data buffer temporary storage 130 in linear chunk order 210. This data entering the SDC 50 and being written to the data buffer temporary storage 130 may be coming from a processor 20 or memory 70. However, in this example embodiment the read request for the same data has come in over the private bus 40 and may be presented in linear chunk order 210. Therefore, in this embodiment not only are the CxV 390 and DxV 400 signals required, but also the FSM.RdTx 410 signal also plays an important role. The FSM.RdTx 410 signal serves to force the data buffer temporary storage 130 to wait until the needed data is available for transmission as will be discussed further ahead. All other signals shown in FIG. 7, but not discussed, are identical to those discussed in reference to FIG. 5 and FIG. 6.

As previously discussed in reference to FIGS. 5 and 6, in FIG. 7 when a processor 20 or I/O interface 115 requests a read, the interface returning data to the data buffer temporary 130 will set LdDVTag 320 to high in clock cycle 300 labeled T1. This interface may be either the internal interfaces 140, 150, 160, and 170. This serves to alert SDC 50 of the incoming data and triggers the control status unit 120 to set DxV 390 to high in clock cycle 300 labeled T2. This setting of DxV 390 bit to high by the control/status unit 120 is to alert the remainder of the SDC 50 that within three clock cycles a write and/or read will begin. Using this DxV 390 bit, the SDC 50 may take preparatory actions in the three clock cycles as discussed in reference to FIGS. 5 and 6. However, as mentioned earlier, data entering the SDC 50 is coming in critical chunk order 215 and is being written in that order to data buffer temporary storage 130. However, the read request for the same data has come into SDC 50 over the private bus 40 in which linear chunk order 210 starting with data chunk DC1 has been specified.

Still referring to FIG. 7, as in FIG. 5, upon arrival of the first byte of data, the control/status unit 120 may set LdWrTx 330 to high in clock cycle 300 labeled T3 to signal the data buffer temporary storage 130 to receive and store the chunks labeled DC1 in clock cycle 300 labeled T4. This writing of data to the data buffer temporary storage 130 may cause the control/status unit 120 to set LdRdTx 350 to high which would cause the data buffer temporary storage unit 130 to begin reading from its memory. However, in this case the data is coming in critical chunk order 215 and the data buffer temporary storage 130 does not have the data in the proper order to send in clock cycle 300 labeled T5 and T6. Therefore, data buffer temporary storage 130 enters a wait state labeled W13 (wait state 1 for 3 data chunks) and W23 (wait state 2 for 3 data chunks) in clock cycles 300 labeled T5 and T6 as shown in FSM.RdTx 410. The data buffer temporary storage 130 may remain in the wait state until it detects that it has all the data needed to fulfil the read request. This occurs in clock cycle 300 labeled T7 at which time data chunk DC2 is written to data buffer temporary storage 130 as shown in WrData 340. Since in clock cycle 300 labeled T7 all the data required by data buffer temporary storage 130 to execute the read operation is in its memory, the read begins in clock cycle 300 labeled T7. This is indicated by both the RdData 360 signal in which data chunks labeled DC1, DC2 and DC3 are read and also by FSM.RdTx 410 which indicates the number of read transactions that remain to complete the read as indicated by Tx3, Tx2, and Tx1 as previously discussed in reference to FIG. 5. Upon completion of the write operation to data buffer temporary storage 130, the LdWrTag 370 may be set high which in turn may cause the CxV 400 bit to be set high as was previously discussed in reference to FIG. 5 and FIG. 6. Again, as discussed in reference to FIG. 5 and FIG. 6, once the read is completed in clock cycle 300 labeled T10, the data buffer temporary storage 130 returns to its idle state (ZZZ) in clock cycle 300 labeled T10.

Therefore, the example embodiment of the present invention shown in FIG. 7 operates in a similar manner to that shown in FIG. 5 with the notable exception that since data is being written to data buffer temporary storage 130 in critical chunk order 215, a wait state is forced in the data buffer temporary storage 130 until the required data is received to perform a read in linear chunk order 210. Using this example embodiment shown in FIG. 7, translation from a first data format (linear chunk order 210) to and from a second data format (critical chunk order 215) is accomplished while maintaining minimal latency and maximum throughput of data.

Copy to Data Buffer Temporary Storage 130 Based on CxV 390 Bit

Under certain circumstances it is desirable to copy data already in data buffer temporary storage 130 to another location in data buffer temporary storage 130 as shown in internal copy operation 180 of FIG. 2. Such a circumstance may occur when a processor 20 or I/O interface 115 is writing data to memory 70 and shortly after the write is completed a read request is made by another processor 20 or I/O interface 115. Since, the data is still in data buffer temporary storage 130, it is significantly faster to access data buffer temporary storage 130 then to read the from memory 70. However, since the data in data buffer temporary storage 130 has already been relinquished by having it been written to memory 70, which will be discussed in detail in reference to FIG. 9, the possibility exists that those memory locations in the data buffer temporary storage 130 may be overwritten by some other write operation. Therefore, copying the data so that it may be read serves to protect the data and make it quickly available by another processor 20 or other requesting device connected to the I/O interface 115.

Figure 8:
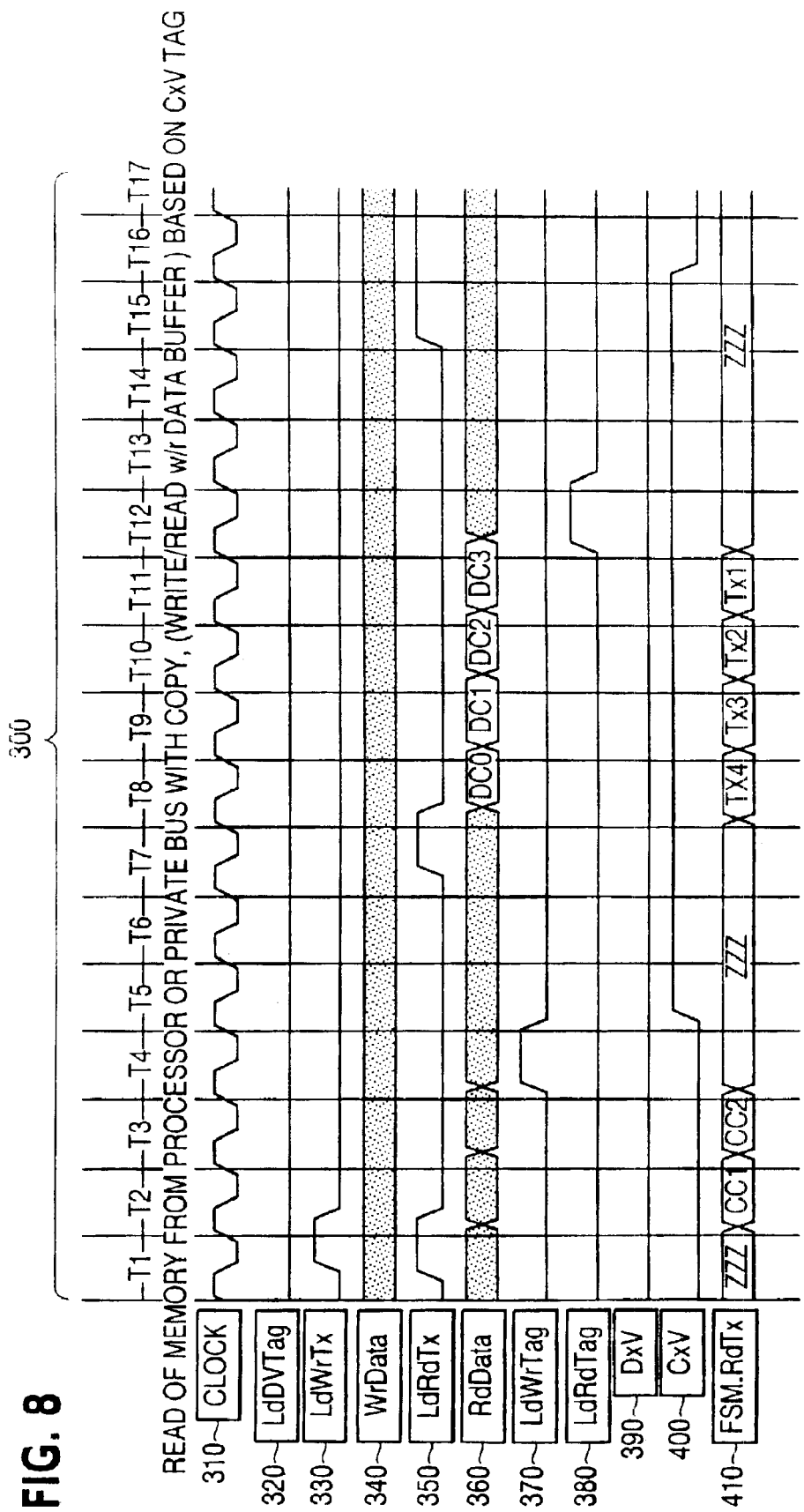
FIG. 8 is also another example signal diagram showing signal levels in an example embodiment of the present invention.

FIG. 8 shows an example embodiment of an internal copy operation 180 in which data was previously written into data buffer temporary storage 130 through either the microprocessor bus 30 or the private bus 40 by a processor 20 or the I/O interface 115. In this example embodiment, a read has been made for data that was previously written to the data buffer temporary storage 130. LdDVTag 320 signal and DxV 390 bit both remain unchanged (low) since no data is coming into the SDC 50. However, both the LdWrTx 330 and the LdRdTx 350 are set high in order to command the data buffer temporary storage 130 to copy the requested data. The copy function is accomplished by the data buffer temporary storage 130 as evidenced by the FSM.RdTx 410 signal changing state from idle (ZZZ) to copy command (CC) function labeled CC1 and CC2. The copy operation is completed in clock cycle 300 labeled T4 and the data buffer temporary storage 130 returns to its idle state in clock cycles 300 labeled T4 through T7. However, since a read request was received by the SDC 50, the LdWrTag 370 may be set high in clock cycle 300 labeled T4 which in turn may set the CxV 400 bit high to effect a read will start in less than three clock cycles 300. As discussed in reference to FIGS. 5–7 this three clock cycle 300 delay is needed for the SDC 50 to take preparatory actions. Then in clock cycle 300 labeled T7 the LdRdTx 350 signal may be set high by the control/status unit 120 to start the read function by the data buffer temporary storage 130. Data is read from the data buffer temporary storage 130 as shown in RdData 360. This activity is further evidenced by the number of bytes remaining to be transferred as indicated by Tx4 through Tx1 in the FSM.RdTx 410 signal. Once the read is completed, the control/status unit 120 indicates so by setting the LdRdTag 380 to high in clock cycle 300 labeled T12.

Using the example embodiment shown in FIG. 8 it is possible to use data already in data buffer temporary storage 130 without the need of retrieving this data from memory 70. At the same time it further assures that the data in data buffer temporary storage 130 will not be overwritten before it can be read out. This is accomplished by the internal copy occurring in the data buffer temporary storage 130 followed by setting the CxV 400 bit to high to prepare the logic for a forthcoming read.

Figure 9:
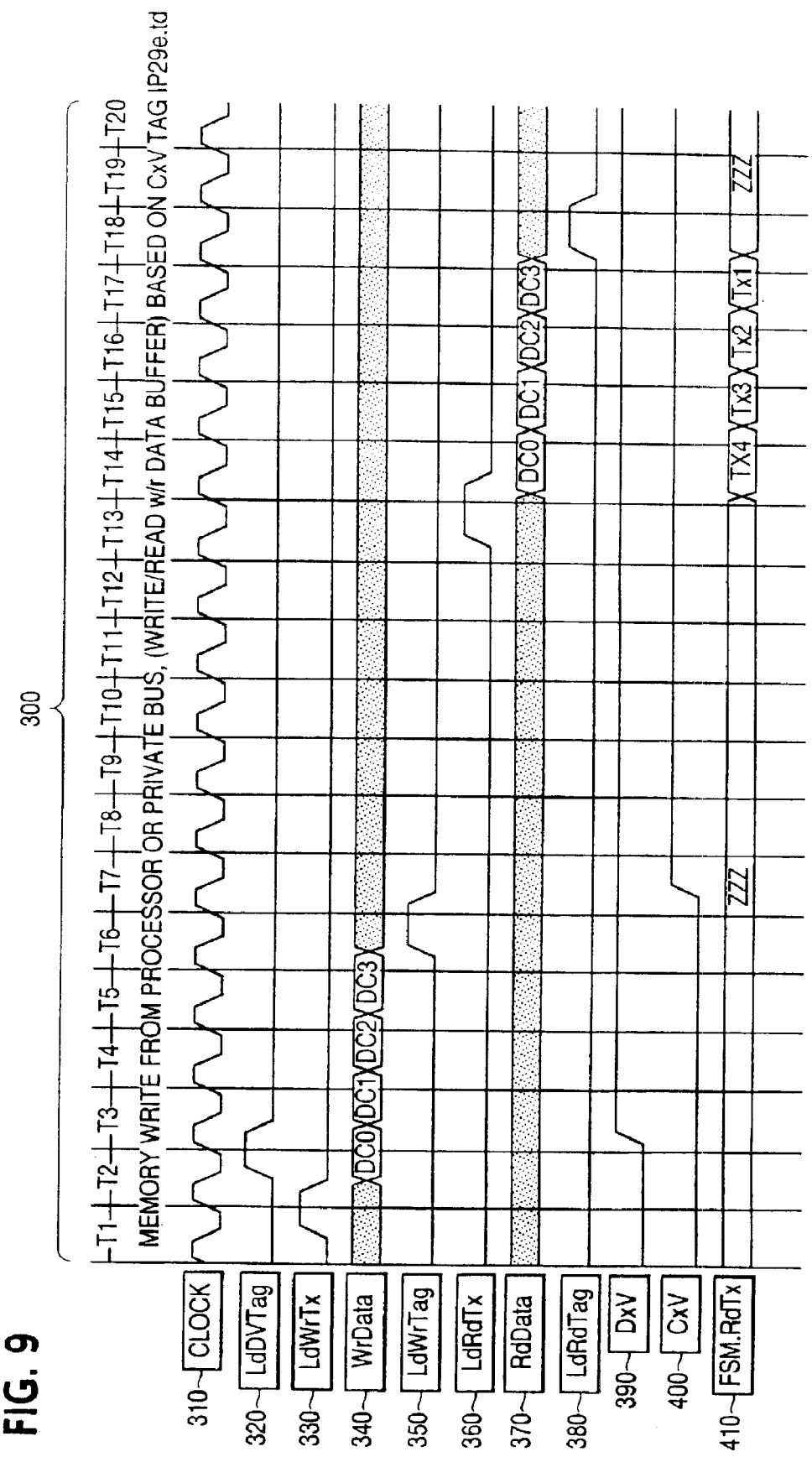
FIG. 9 is still another example signal diagram showing signal levels in an example embodiment of the present invention.

Write Operation from Microprocessor Bus 30 or Private Bus 40 Based on CxV 400 Bit FIG. 9 is a signal diagram showing the signal levels seen in the SDC 50 during an example write operation from the microprocessor bus 30 or the private bus 40 to memory 70 or other device using the SDC 50. This is the first example in the discussion of the example embodiments of this invention in which a write operation to the data buffer temporary storage 130 is not due to a read request. Further, unlike read operations in which the goal is to supply the requesting processor 20 or I/O interface 115 with the requested data with minimum latency and maximum throughput, this is not as great a concern when only a write to memory 70 is occurring. Still further, there is an advantage to having a write operation which is not optimized. This advantage is that the data is more likely to be present in the data buffer temporary storage 130 when a read request for that data comes into the SDC 50 which allows for quick retrieval using the copy operation shown in FIG. 8.

Referring to FIG. 9, since a write is occurring in this embodiment it is LdWrTx 330 that is set high in clock cycle 300 labeled T1 by the microprocessor bus 30 or the private bus 40 that signals the data buffer temporary storage 130 and the control/status unit 120 to anticipate incoming data in the next clock cycle. Data begins to arrive in clock cycle 300 labeled T2 and is written to data buffer temporary storage 130 and then LdDVTag 320 may be set high which in turn sets DxV 390 bit high. Thus, the SDC 50 is unable to use DxV 390 bit to prepare for the next operation as was previously discussed in FIGS. 5–7. Once all the data is written to the data buffer temporary storage 130, the LdWrTag 350 signal may be set high to indicate the completion of the write which in turn may trigger the setting of the CxV 400 bit to high. Once data chunks DC0 through DC3 are written to the data buffer temporary storage 130 as shown in WrData 340 more than seven clock cycles 300 elapse before a read operation out of the data buffer temporary storage 130 is started. This read operation start is signaled by setting the LdRdTx 360 bit to high in clock cycle 300 labeled T13. Then in clockcycles 300 labeled T14 through T17 the data is read out of the data buffer temporary storage 130 and sent to memory 70 as evidenced by RdData 370 and FSM.RdTx 410. As discussed for FIGS. 5–8 the FSM.RdTx 410 shows the idle state (ZZZ) of the data buffer temporary storage 130 and the data chunks that remain to be transferred as Tx4 through Tx1. Once all the data is read out of the data buffer temporary storage 130 the LdRdTag 380 is set high in clock cycle 300 labeled T18.

Using the embodiments of the present invention discussed above, it is possible to optimize read operations so as to minimize the time a processor 20 or I/O interface 115 must wait in order to retrieve data and instructions from memory 70 or other source. Further, using the valid control bits, of the example embodiments of the present invention, it is possible to simplify the design of the SDC 50 so that it requires less board space and power while still minimizing latency and maximizing throughput for read operations.

While we have shown and described only one example herein, it is understood that numerous changes and modifications as known to those skilled in the art could be made in the system data chip. For example, the functions of both the system address chip 60 and the system data chip 50 could be incorporated into a single chip. Therefore, we do not wish to be limited to the details shown and described herein, but intend to cover all such changes and modifications as are encompassed by the scope of the appended claims.

We claim:

1. A method comprising
receiving chunks of a first cache line,
storing chunks of the first cache line in a buffer in a first chunk order,
receiving chunks of a second cache line,
storing chunks of the second cache line in the buffer in a second chunk order, and
presenting a requestor with one or more chunks of the first cache line from the buffer, wherein
storing chunks of the first cache line comprises storing chunks of the first cache line in a linear chunk order, and
presenting comprises presenting one or more chunks of the first cache line to the requester in a critical chunk order.

2. The method of claim 1 further comprising presenting the requester with one or more chunks of the second cache line from the buffer.

3. The method of claim 1 wherein
storing chunks of the second cache line comprises storing chunks of the second cache line in a critical chunk order.

4. A method comprising
receiving chunks of a first cache line,
storing chunks of the first cache line in a buffer in a first chunk order,
receiving chunks of a second cache line,
storing chunks of the second cache line in the buffer in a second chunk order, and presenting a requestor with one or more chunks of the first cache line from the buffer, wherein storing chunks of the first cache line comprises storing chunks of the first cache line in a critical chunk order, and presenting comprises presenting one or more chunks of the first cache line to the requester in a linear chunk order.

5. The method of claim 4 further comprising presenting another requester with one or more chunks of the second cache line from the buffer.

6. An apparatus comprising a first interface to receive chunks of a first cache line, a second interface to receive chunks of a second cache line, a buffer to store chunks of the first cache line in a first chunk order and to store chunks of the second cache line in a second chunk order, and a control unit to present a requester via the second interface with one or more chunks of the first cache line from the buffer, wherein the control unit presents another requester via the first interface with the one or more chunks of the second cache line from the buffer.

7. The apparatus of claim 6 wherein the control unit presents the requester via the second interface with one or more chunks of the second cache line from the buffer.

8. The apparatus of claim 6, wherein the buffer stores chunks of the first cache line in a critical chunk order, and stores chunks of the second cache line in a linear chunk order.

9. The apparatus of claim 6 wherein the buffer stores chunks of the first cache line in a critical chunk order, and the control unit presents the requester with one or more chunks of the first cache line in a linear chunk order.

10. The apparatus of claim 6 wherein the buffer stores chunks of the first cache line in a linear chunk order, and the control unit presents the requester with one or more chunks of the first cache line in a critical chunk order.

11. The apparatus of claim 6 wherein the control unit presents the requester with one or more chunks of the first cache line in the first chunk order.

12. A system comprising a requester to generate read requests, memory to store cache lines, and an apparatus to store in a first chunk order a cache line received from the memory in response to a read request of the requester, and to present the requester with chunks of the cache line in a second chunk order, wherein the first chunk order comprises a linear chunk order and the second chunk order comprise a critical chunk order.

13. The system of claim 12 wherein the apparatus stores in the second chunk order another cache line received from the memory in response to another read request of the requester, and presents the requester with chunks of the another cache line in the first chunk order.

14. The system of claim 12 wherein the apparatus stores in the first chunk order another cache line received from the memory in response to another read request of the requester, and presents the requester with chunks of the another cache line in the first chunk order.

15. The system of claim 12 wherein the requester comprises a processor.

16. The system of claim 12 wherein the requester comprises an input/output interface.

* * * * *